(12) United States Patent
Thoemmes et al.

(10) Patent No.: US 6,346,943 B1
(45) Date of Patent: Feb. 12, 2002

(54) METHOD, APPARATUS, AND ARTICLE OF MANUFACTURE FOR DEFINING A RELATIVE POLAR ANGLE SNAP CAD TOOL

(75) Inventors: Alexander Thoemmes, San Rafael; Brett K. Bloomquist, Santa Rosa, both of CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/256,664

(22) Filed: Feb. 24, 1999

(51) Int. Cl.7 .............................................. G06T 11/20
(52) U.S. Cl. ..................... 345/443; 345/443; 345/964
(58) Field of Search .................. 345/326, 347, 345/433, 437, 438, 439, 441, 443, 964; 395/133, 135, 137–139, 140–143, 119, 120, 326, 357; 700/182

(56) References Cited

U.S. PATENT DOCUMENTS

| | | | |
|---|---|---|---|
| 5,490,241 A | 2/1996 | Mallgren et al. | |
| 5,572,639 A | 11/1996 | Gantt | |
| 5,689,717 A | * 11/1997 | Pritt | 395/773 |
| 5,793,377 A | * 12/1998 | Moore | 345/433 |

* cited by examiner

*Primary Examiner*—Almis R. Jankus
*Assistant Examiner*—G. F. Cunningham
(74) *Attorney, Agent, or Firm*—Gates & Cooper LLP (57) ABSTRACT

A method, apparatus, article of manufacture, for implementing a relative polar angle snap tool. The relative polar angle snap tool allows the user to define lines and shapes that are at pre-settable angles relative to existing lines and shapes, and at pre-settable lengths.

27 Claims, 6 Drawing Sheets

METHOD, APPARATUS, AND ARTICLE OF MANUFACTURE FOR DEFINING A RELATIVE POLAR ANGLE SNAP CAD TOOL

CROSS-REFERENCE TO RELATED APPLICATIONS

This application is related to the following co-pending and commonly assigned patent applications, all of which applications are incorporated by reference herein:

Application Ser. No. 09/256,896, entitled "ACQUIRING AND UNACQUIRING ALIGNMENT AND EXTENSION POINTS," filed on same date herewith, by Alexander Thoemmes and Brett K. Bloomquist; and Application Ser. No. 09/256,661, entitled "AUTOMATIC TRACKING OF TEMPORARY POINTS," filed on same date herewith, by Brett K. Bloomquist and Alexander Thoemmes.

BACKGROUND OF THE INVENTION

1. Field of the Invention

The present invention relates to computer-implemented systems and methods for drawing images, and in particular to a computer-aided drafting tool for drawing lines at pre-settable angles from an existing linear entity and at pre-settable distances from pick points on the existing linear entity.

2. Description of the Related Art

Computer Aided Design (CAD) and other drawing programs allow the preparation and editing of machine drawings, schematic drawings, and artwork. Typically, the user creates these drawings with the use of a library of objects and a number of drawing tools. These drawing tools allow the user to define and edit lines, polygons, ovoids, and other shapes.

One useful feature in such drawing programs is the ability to snap lines, and shapes to certain global coordinate frames. An example of such a system is the polar coordinate snap tool disclosed in U.S. Pat. No. 5,793,377, issued to Moore on Aug. 11, 1998, which is hereby incorporated by reference herein. This snap tool allows the user to specify a polar coordinate snap angle and length to which all future lines will be constrained.

However, in prior systems, the polar coordinate snap angle and length is referenced to a fixed (x,y) Cartesian coordinate frame, and hence only permit the drawings to snap to a coordinate frame that is globally applied to an entire drawing. No provision is made to constrain a new line to a specified geometrical relationship (such as a relative angle) with an existing line. This deficiency limits the usefulness of the conventional polar snap tools. What is needed is a tool that allows the user to draw new lines with specific, pre-defined geometrical relationships with existing lines. The present invention satisfies that need.

SUMMARY OF THE INVENTION

To address the requirements described above, the present invention discloses a method, apparatus, article of manufacture for defining a line at a relative angle from a linear entity.

The method comprises the steps of accepting a command having a first pick point on the linear entity, computing an extension line extending from the first pick at a pre-settable relative angle from the linear entity when indicated by a position of a cursor, and displaying the extension line. In one embodiment, the extension line is snapped to a pre-set line based upon the distance between the cursor and the pre-set line. In another embodiment, the extension line is snapped to a pre-set line based upon its angular proximity to one of the pre-set snap lines. In yet another embodiment, the extension line is snapped to the pre-set line using either of the above methods, depending upon the distance between the cursor and the first pick point. Provision is made to snap the length of the extension line to a pre-settable linear distance from the linear entity.

The apparatus comprises a means for accepting a command having a first pick point on the linear entity, means for computing an extension line extending from the first pick point at a pre-settable relative angle from the linear entity when indicated by a position of the first cursor, and a means for displaying the extension line. In one embodiment of the present invention, the means for performing these operations are implemented in a computer operatively coupled to a display device. The article of manufacture comprises a data storage device tangibly embodying instructions to perform the method steps described above.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
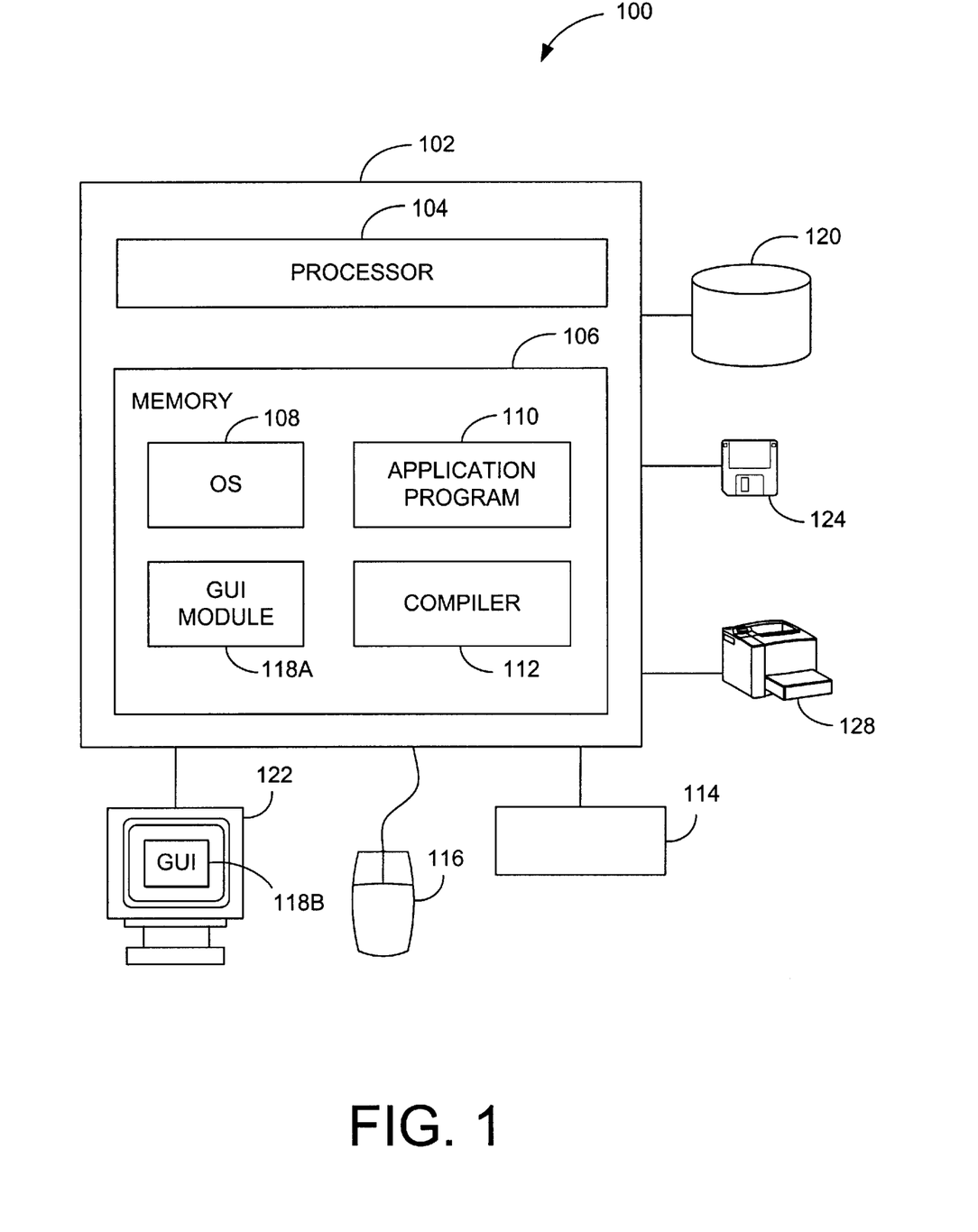
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer 128, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI)

module 118A. Although the GUI module 118A is depicted as a separate module, the instructions performing the GUI functions can be resident or distributed in the operating system 108, the application program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2A:
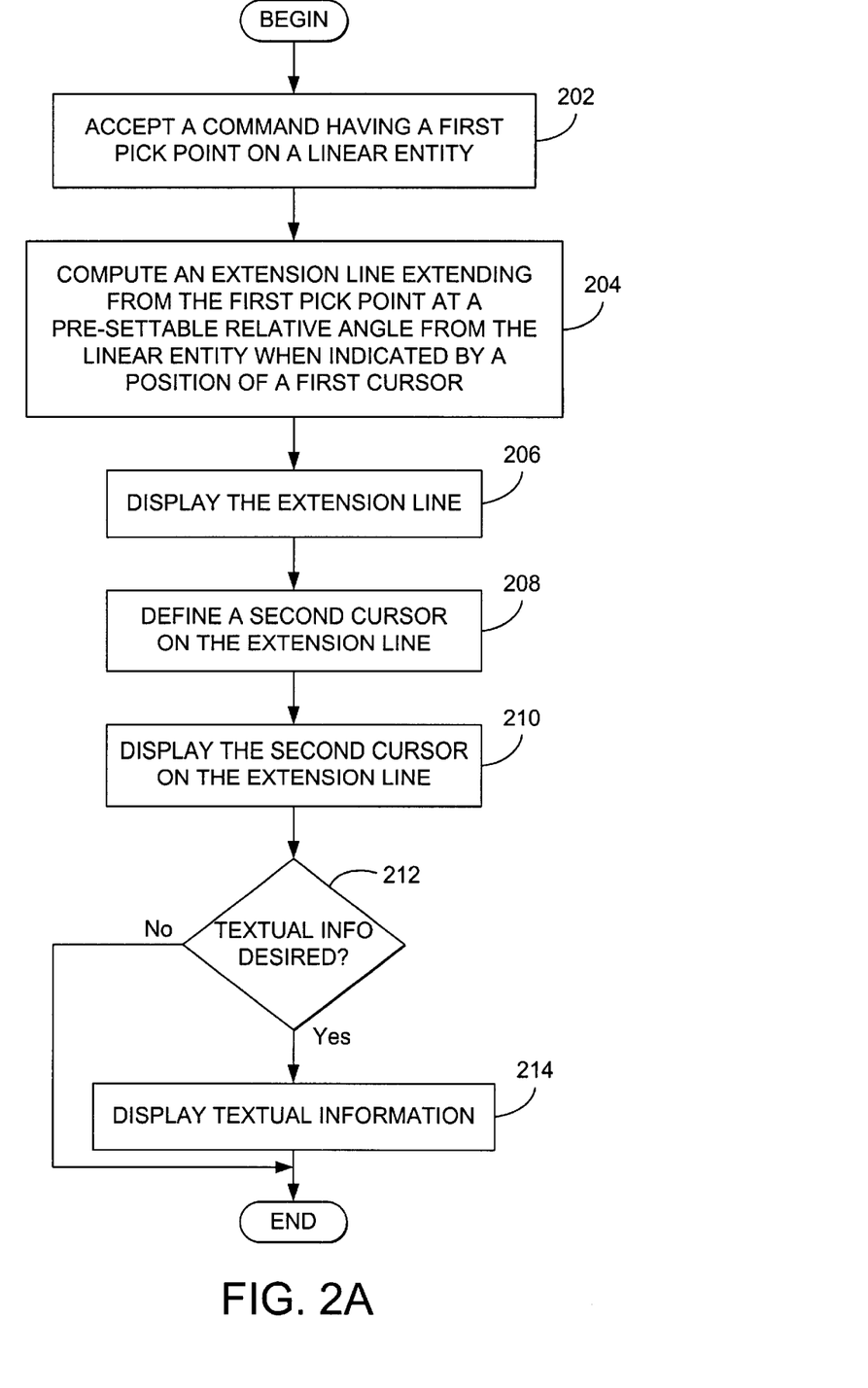
FIGS. 2A–2C are flow charts presenting illustrative examples of process steps used to implement the relative polar snap tool.
Figure 2B:
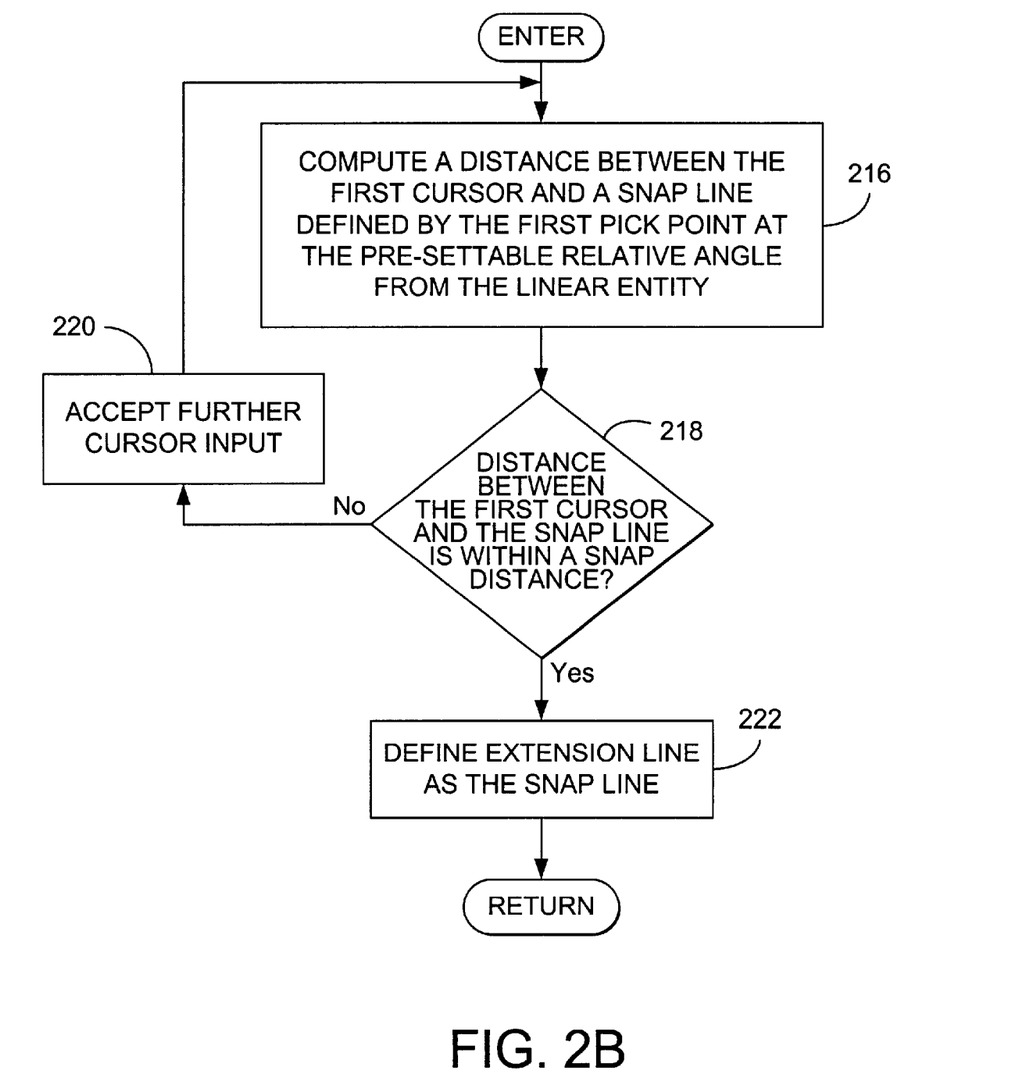
Figure 2C:
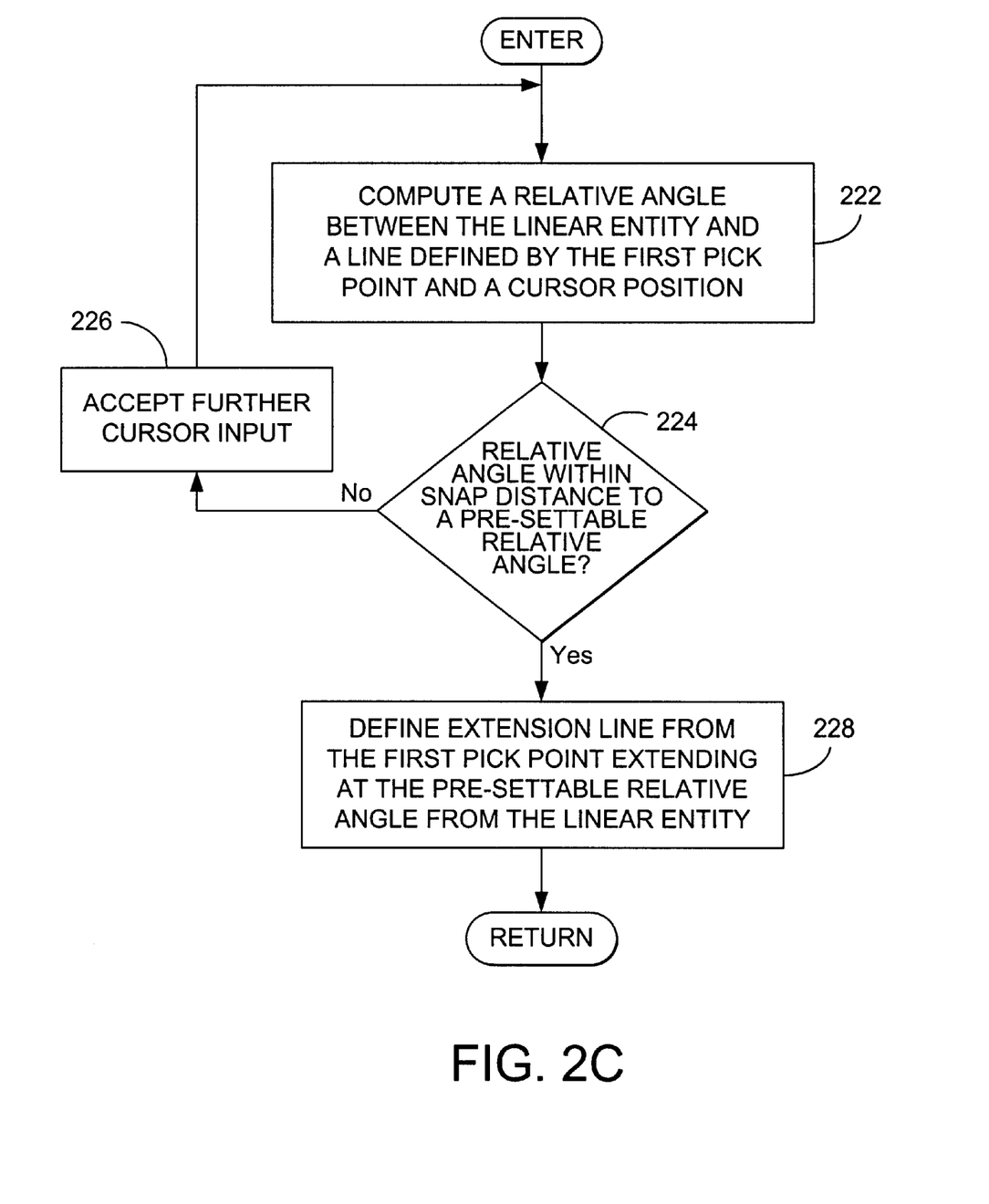

FIGS. 2A–2C are flow charts showing exemplary operations used to practice the present invention. FIGS. 2A–2C are discussed in conjunction with FIGS. 3 and 4, which present illustrative examples of the relative polar angle snap tool.

Figure 3:
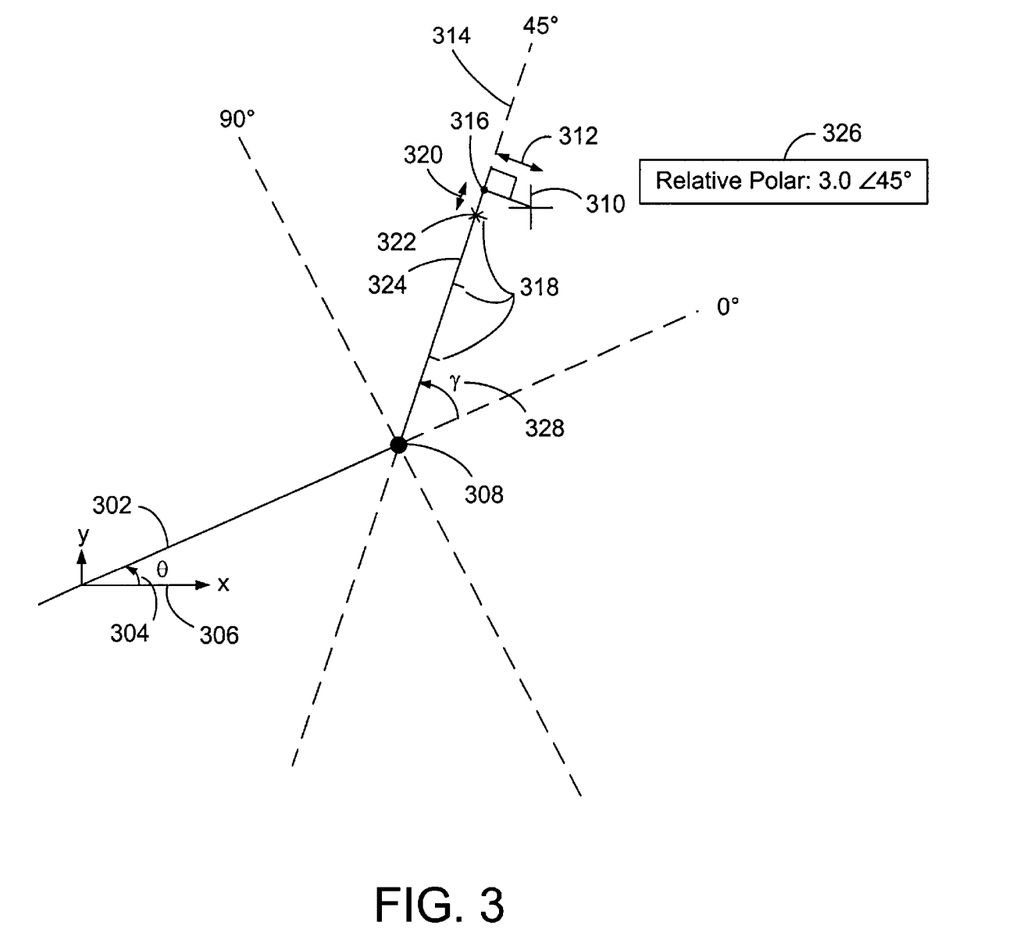
FIG. 3 is a diagram showing the operation of one embodiment of the relative polar snap tool, in which the distance between the cursor and the snap line is defined by the first pick point at a pre-settable relative angle.

FIG. 2A is a flow chart showing the operations used to practice one embodiment of the present invention. First, a first pick point 308 on a linear entity such as existing line 302 is defined, as shown in block 202. This can be implemented by a command having the first pick point 308. Typically, the first pick point 308 is selected by positioning a cursor over the point with a mouse 116 or other pointing device, and depressing a mouse button. The first pick point 308 can be selected by other methods as well. For example, in cases where the first pick point 308 is the end point of the existing line 302, the instructions used to draw the existing line 308 can automatically select the end point of the existing line 308 as the first pick point 308, or the user may elect to do so by a menu selection using the GUI 118B. Further, the first pick point can be any point along the existing line 302, including an end point or a center point of the existing line 302.

In the illustrated embodiment, the linear entity is a line 302, but this need not be the case. The linear entity can also be a linearly representable attribute of a wide variety of objects. For example, the linear entity could be the major or minor axis of an elliptically-shaped object. Similarly, the linear entity can be a tangent of an arc or a circle at a selected point (for example, the mid-point of an arc), or one of the sides of a multi-sided polygon.

The existing line 302 is typically drawn at an angle θ 304 to the horizontal global reference or x-axis 306. However, the existing line can be drawn such that the existing line is parallel to the x-axis (θ=0) as well.

Next, an extension line 324 is computed when indicated by the position of the cursor 310, as shown in block 204. The extension line 324 extends from the first pick point 308 at a pre-settable relative angle from the linear entity 302. This operation is depicted in block 204 of FIG. 2A. The extension line 324 is then displayed 206. In the illustrated embodiment, the extension line 324 is a rubber-banded line.

In one embodiment of the present invention, the relative snap tool also allows the user to snap to one of a plurality of pre-settable extension line lengths. This is accomplished by defining a second cursor 322 on the extension line 324, and displaying the second cursor 322 on the display 122. The user may then select a button on the mouse 116 to define the length of the extension line 324. In one embodiment, the length of the extension line 324 is determined by determining a reference point 316 on the extension or snap line 314 that is nearest the position of the first cursor 310. Then, a determination is made as to when the reference point 316 is within an extension line snap distance 320 from one of a plurality of pre-settable distances 318 from the first pick point 308. In the embodiment illustrated in FIG. 3, the reference point 316 is within an extension line snap distance 320 from the third pre-settable distance from the first pick point. Accordingly, the second cursor 322 is placed in this position along the extension line 324.

In another embodiment of the present invention, the relative snap tool also optionally provides a pop-up 326 that displays textual information about the relative polar snap parameters. In the embodiment illustrated in FIG. 3, the pop-up 326 shows that the relative polar snap tool is active, and that the extension line snap length and angle are set to three units and 45 degrees, respectively. If desired, the user may use the mouse to select the pop-up window, and change the relative polar snap tool parameters. As shown in blocks 212 and 214 of FIG. 2A, the pop-up function can be bypassed if desired.

FIG. 2B is a flow chart illustrating one embodiment of the computation of the extension line 324 in one embodiment of the present invention. FIG. 3 is a diagram showing an application of the process steps shown in FIG. 2B. In this embodiment, the extension line 314 is computed from a distance 312 from a first cursor 310 and snap line 314 defined by the first pick point 308 and at a pre-settable angle γ 328 from the existing line 302, as shown in block 216. If the distance 312 between the first cursor 310 and the snap line 314 is less than a snap distance, an extension line 324 is defined from the snap line 314, as shown in blocks 218 and 222. If the distance 312 between the first cursor 310 and the snap line 314 is more than the snap distance, the extension line 324 is not defined or displayed, and further cursor input is accepted, as shown in blocks 218 and 220.

Figure 4:
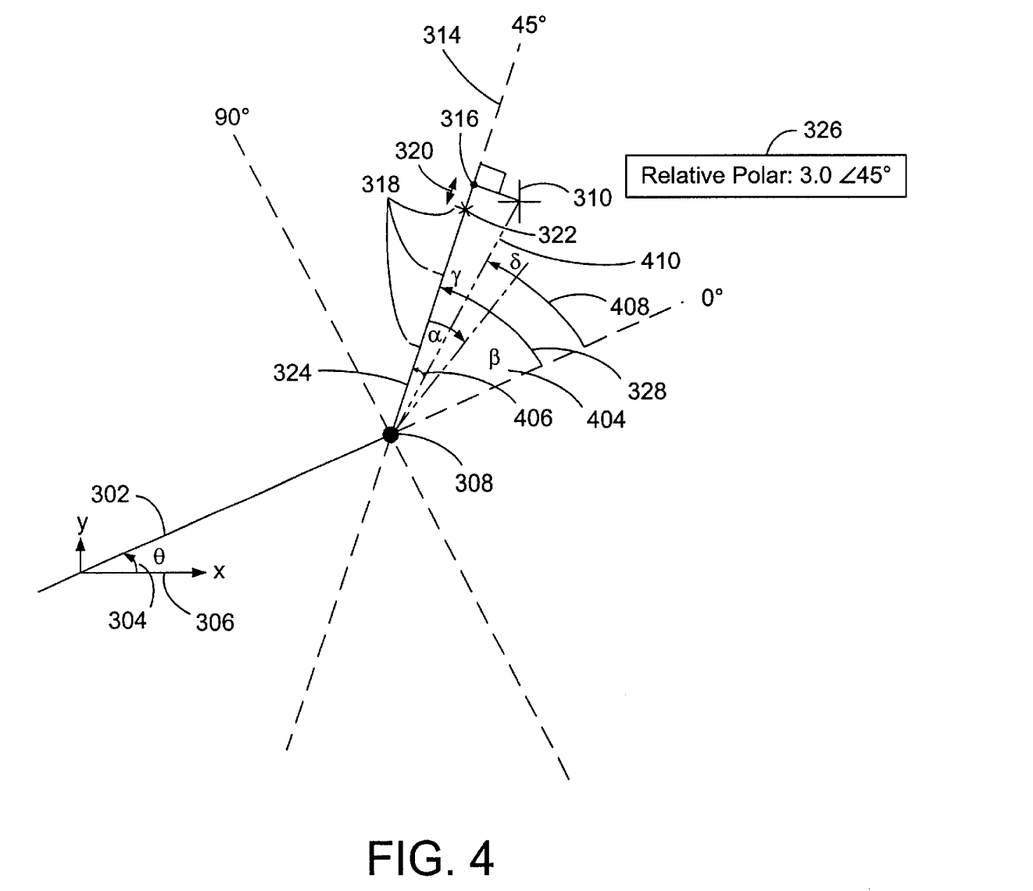
FIG. 4 is a diagram showing the operation of a second embodiment of the relative polar angle snap tool in which the angle between the first pick point and the cursor is used to determine the extension line.

FIG. 2C is a flow chart illustrating another embodiment of the computation of the extension line 324. FIG. 4 is a diagram showing application of the process steps shown in FIG. 2C. In this embodiment, the extension line 314 is determined by computing a relative angle δ 408 between the existing line 302 and a cursor line 410 line defined by the first pick point 308 and the first cursor 310 position, as shown in block 222 of FIG. 2C. If the relative angle δ 408 is not within a snap distance (here, an angular distance β 404) to a pre-settable relative angle γ 328, the snap line 314 is not drawn, and further cursor input is accepted. This is depicted in blocks 224 and 226 of FIG. 2C. If, as illustrated in FIG. 4, the relative angle δ 408 is within the angular snap distance β 404 to a pre-settable relative angle δ 408, the snap line 314 is drawn, and the extension line 324 is defined from the first pick point 308 and extending at the pre-settable relative angle δ 408 from the existing line 302.

The foregoing discloses two methods for computing the extension line 324. The first method compares the angle formed between the existing line 302 and the line defined by the first pick point 308 and the cursor 310 with the pre-settable angles, and defines an extension line 324 when the angle is within a first snap distance or snap angle. The second method uses the distance from the cursor position to the nearest of the lines emanating from the first pick point 308 at the pre-settable angles relative to the existing line 302. In one embodiment of the present invention, the method of computing the extension line is selected from these two methods depending upon a user-settable mode distance from the first pick point 308 to the cursor 310 position. For example, as the cursor 310 approaches the first pick point 308, the extension line 324 may be determined by the second method, whereas when the cursor is farther away from the first pick point 308, the extension line may be determined by the second method.

CONCLUSION

This concludes the description of the preferred embodiments of the present invention. In summary, the present invention describes a method, apparatus, and article of manufacture for defining a relative polar snap tool.

The method comprises the steps of accepting a command having a first pick point on the linear entity, computing an extension line extending from the first pick at a pre-settable relative angle from the linear entity when indicated by a position of a cursor, and displaying the extension line. In one embodiment, the extension line is snapped to a pre-set line based upon the distance between the cursor and the pre-set line. In another embodiment, the extension line is snapped to a pre-set line based upon its angular proximity to one of the pre-set snap lines. In yet another embodiment, the extension line is snapped to the pre-set line using either of the above methods, depending upon the distance between the cursor and the first pick point. Provision is made to snap the length of the extension line to a pre-settable linear distance from the linear entity.

The apparatus comprises a means for accepting a command having a first pick point on the linear entity, means for computing an extension line extending from the first pick point at a pre-settable relative angle from the linear entity when indicated by a position of the first cursor, and a means for displaying the extension line. In one embodiment of the present invention, the means for performing these operations are implemented in a computer operatively coupled to a display device. The article of manufacture comprises a data storage device tangibly embodying instructions to perform the method steps described above.

The foregoing description of the preferred embodiment of the invention has been presented for the purposes of illustration and description. It is not intended to be exhaustive or to limit the invention to the precise form disclosed. Many modifications and variations are possible in light of the above teaching. For example, in the foregoing illustrative examples, the first pick point was selected as an end point or a center point of the linear entity. However, the first pick point can be any point on the linear entity, allowing present invention to be used to define a line extending from any point on the linear entity at the desired relative angle.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of defining a new extension line at a relative angle from an existing linear entity, comprising:

(a) defining a first pick point on an existing linear entity;

(b) computing a new extension line extending from the first pick point at a pre-settable relative angle from the existing linear entity when indicated by a position of a first cursor by:

(i) computing a relative angle between the existing linear entity and a cursor line defined by the first pick point and the first cursor and defining a new extension line from the first pick point when the relative angle is within a snap distance to a pre-settable relative angle, the new extension line extending at the pre-settable relative angle from the existing linear entity when the cursor and the first pick point are within a mode distance; and (ii) computing a distance between the cursor and a snap line extending from the first pick point at the pre-settable relative angle from the existing linear entity, and defining the new extension line as the snap line when the distance between the cursor and the new extension line is within a snap distance and the cursor and the first pick point are not within the mode distance; and (c) displaying the new extension line.

2. The method of claim 1, wherein computing a new extension line from the first pick point at a pre-settable angle from the existing linear entity when indicated by a first cursor comprises:

computing a distance between the first cursor and a snap line extending from the first pick point at the pre-settable relative angle from the existing linear entity; and defining the new extension line from the snap line when the distance between the first cursor and the snap line is within a snap distance.

3. The method of claim 1, wherein computing a new extension line from the first pick point at a pre-settable angle from the existing linear entity when indicated by a first cursor comprises:

computing a relative angle between the existing linear entity and a cursor line defined by the first pick point and the first cursor; and defining a new extension line from the first pick point when the relative angle is within a snap angle to a pre-settable relative angle, the new extension line extending at the pre-settable relative angle from the existing linear entity.

4. The method of claim 3, further comprising:

defining a second cursor on the new extension line; and displaying the second cursor on the new extension line.

5. The method of claim 4, wherein the step of defining the second cursor on the extension line comprises:

determining a reference point on the extension line that is nearest to the first cursor;

determining when the reference point is within an extension line snap distance from a pre-settable distance from the first pick point; and defining the second cursor on the extension line at the pre-settable distance from the first pick point.

6. The method of claim 1, wherein the first pick point is an endpoint of the linear entity.

7. The method of claim 1, wherein the first pick point is a center point of the linear entity.

8. The method of claim 1, further comprising annotating the display with textual information about the new extension line.

9. The method of claim 8, wherein the textural information is selected from the group comprising the pre-settable distance from the first pick point and the pre-settable relative angle.

10. An apparatus of defining a new line at a relative angle from an existing linear entity, comprising:
(a) means for defining a first pick point on an existing linear entity;
(b) means for computing a new extension line extending from the first pick point at a pre-settable relative angle from the existing linear entity when indicated by a position of a first cursor, wherein the means for computing comprises:
  (i) means for computing a relative angle between the existing linear entity and a cursor line defined by the first pick point and the first cursor and defining a new extension line from the first pick point when the relative angle is within a snap distance to a pre-settable relative angle, the new extension line extending at the pre-settable relative angle from the existing linear entity when the cursor and the first pick point are within a mode distance; and
  (ii) means for computing a distance between the cursor and a snap line extending from the first pick point at the pre-settable relative angle from the existing linear entity, and defining the new extension line as the snap line when the distance between the cursor and the new extension line is within a snap distance and the cursor and the first pick point are not within the mode distance; and
(c) means for displaying the new extension line.

11. The apparatus of claim 10, wherein the means for computing a new extension line from the first pick point at a pre-settable angle from the existing linear entity when indicated by a first cursor comprises:

means for computing a distance between the first cursor and a snap line extending from the first pick point at the pre-settable relative angle from the existing linear entity; and means for defining the new extension line from the snap line when the distance between the first cursor and the snap line is within a snap distance.

12. The apparatus of claim 10, wherein the means for computing a new extension line from the first pick point at a pre-settable angle from the existing linear entity when indicated by a first cursor comprises:

means for computing a relative angle between the existing linear entity and a cursor line defined by the first pick point and the first cursor; and means for defining a new extension line from the first pick point when the relative angle is within a snap angle to a pre-settable relative angle, the new extension line extending at the pre-settable relative angle from the existing linear entity.

13. The apparatus of claim 12, further comprising:
means for defining a second cursor on the new extension line; and
means for displaying the second cursor on the new extension line.

14. The apparatus of claim 13, wherein the means for defining the second cursor on the new extension line comprises:
means for determining a reference point on the new extension line that is nearest to the first cursor;
means for determining when the reference point is within an extension line snap distance from a pre-settable distance from the first pick point; and
means for defining the second cursor on the new extension line at the pre-settable distance from the first pick point.

15. The apparatus of claim 10, wherein the first pick point is an endpoint of the existing linear entity.

16. The apparatus of claim 10, wherein the first pick point is a center point of the existing linear entity.

17. The apparatus of claim 10, further comprising means for annotating the display with textual information about the new extension line.

18. The apparatus of claim 17, wherein the textual information is selected from the group comprising the pre-settable distance from the first pick point and the pre-settable relative angle.

19. A program storage device, readable by a computer, tangibly embodying at least one program of instructions executable by the computer to perform method steps of defining a new line at a relative angle from an existing linear entity, the method comprising:
(a) defining g a first pick point on an existing linear entity;
(b) computing a new extension line extending from the first pick point at a pre-settable relative angle from the existing linear entity when indicated by a position of a first cursor by:
  (i) computing a relative angle between the existing linear entity and a cursor line defined by the first pick point and the first cursor and defining a new extension line from the first pick point when the relative angle is within a snap distance to a pre-settable relative angle, the new extension line extending at the pre-settable relative angle from the existing linear entity when the cursor and the first pick point are within a mode distance; and
  (ii) computing a distance between the cursor and a snap line extending from the first pick point at the pre-settable relative angle from the existing linear entity, and defining the new extension line as the snap line when the distance between the cursor and the new extension line is within a snap distance and the cursor and the first pick point are not within the mode distance; and
(c) displaying the new extension line.

20. The program storage device of claim 19, wherein computing a new extension line from the first pick point at a pre settable angle from the exisiting linear entity when indicated by a first cursor comprise:
computing a distance between the first cursor and a snap line extending from the first pick point at the pre-settable relative angle from the existing linear entity; and
defining the new extension line from the snap line when the distance between the first cursor and the snap line is within a snap distance.

21. The program storage device of claim 19, wherein computing a new extension line from the first pick point at a pre-settable angle from the existing linear entity when indicated by a first cursor comprises:

computing a relative angle between the existing linear entity and a cursor line defined by the first pick point and the first cursor; and     defining a new extension line from the first pick point when the relative angle is within a snap angle to a pre-settable relative angle, the new extension line extending at the pre-settable relative angle from the existing linear entity.

22. The program storage device of claim 21, wherein the method further comprises:

defining a second cursor on the new extension line; and displaying the second cursor on the new extension line.

23. The program storage device of claim 22, wherein defining the second cursor on the new extension line comprises:

determining a reference point on the new extension line that is nearest to the first cursor;

determining when the reference point is within an extension line snap distance from a pre-settable distance from the first pick point; and     defining the second cursor on the new extension time at the pre-settable distance from the first pick point.

24. The program storage device of claim 19, wherein the first pick point is an endpoint of the linear entity.

25. The program storage device of claim 19, wherein the first pick point is a center point of the linear entity.

26. The program storage device of claim 19, wherein comprises annotating the display with textual information about the new extension line.

27. The program storage device of claim 26, wherein the textual information is selected from the group comprising the pre-settable distance from the first pick point and the pre-settable relative angle.

\* \* \* \* \*

UNITED STATES PATENT AND TRADEMARK OFFICE
CERTIFICATE OF CORRECTION

PATENT NO. : 6,346,943 B1
DATED : February 12, 2002
INVENTOR(S) : Alexander Thoemmes and Bret K. Bloomquist It is certified that error appears in the above-identified patent and that said Letters Patent is hereby corrected as shown below:

Column 6,
Line 66, after "wherein" strike "the step of".

Column 7,
Line 1, after "the" insert -- new --; and
Line 6, after "the" (second occurrence) insert -- new --.

Column 8,
Line 34, after "defining" strike "g".

Column 10,
Line 12, after "wherein" insert -- the method further --.

Signed and Sealed this

Twenty-seventh Day of May, 2003

JAMES E. ROGAN
*Director of the United States Patent and Trademark Office*